(12) United States Patent
Kragel et al.

(10) Patent No.: US 11,922,036 B2
(45) Date of Patent: Mar. 5, 2024

(54) HOST DATA STREAM ASSIGNMENT WITH SPACE-LEVELING ACROSS STORAGE BLOCK CONTAINERS

(71) Applicant: Western Digital Technologies, Inc., San Jose, CA (US)

(72) Inventors: Oleg Kragel, San Jose, CA (US); Vijay Sivasankaran, Dublin, CA (US); Mikhail Palityka, Oakville (CA); Lawrence Vazhapully Jacob, Folsom, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 66 days.

(21) Appl. No.: 17/743,292

(22) Filed: May 12, 2022

(65) Prior Publication Data

US 2023/0367499 A1    Nov. 16, 2023

(51) Int. Cl.
*G06F 3/06* (2006.01)
(52) U.S. Cl.
CPC .......... *G06F 3/064* (2013.01); *G06F 3/0604* (2013.01); *G06F 3/0659* (2013.01); *G06F 3/0673* (2013.01)
(58) Field of Classification Search
CPC ...................................................... G06F 3/06
See application file for complete search history.

(56) References Cited

U.S. PATENT DOCUMENTS

| | | | |
|---|---|---|---|
| 7,558,197 B1* | 7/2009 | Sindhu | ..................... H04L 47/50 370/414 |
| 8,423,713 B2 | 4/2013 | Hamaguchi | |
| 9,927,983 B2* | 3/2018 | Benisty | .................... G06F 3/061 |
| 10,379,742 B2 | 8/2019 | Smith et al. | |
| 10,572,160 B1 | 2/2020 | Farhan et al. | |
| 11,036,407 B1 | 6/2021 | Tikoo et al. | |
| 2002/0091882 A1* | 7/2002 | Espeseth | ............... G06F 3/0676 711/158 |
| 2019/0042150 A1 | 2/2019 | Wells et al. | |
| 2019/0354478 A1 | 11/2019 | Kashyap et al. | |
| 2020/0089407 A1 | 3/2020 | Baca et al. | |
| 2020/0167274 A1 | 5/2020 | Bahirat et al. | |
| 2020/0356306 A1 | 11/2020 | Subbarao | |
| 2020/0356484 A1 | 11/2020 | Subbarao | |
| 2020/0393974 A1 | 12/2020 | Bahirat | |

(Continued)

FOREIGN PATENT DOCUMENTS

CN        111694515 A        9/2020

*Primary Examiner* — Khoa D Doan
(74) *Attorney, Agent, or Firm* — Michael Best & Friedrich LLP

(57) ABSTRACT

Host data stream assignment with space-leveling across storage block containers. In one example, a data storage device including an electronic processor that, when executing a space-leveling scheme, is configured to receive a first host data stream, store the first host data stream in a block container assignment queue (BCAQ), detect a next storage block container switching event, responsive to detecting the next storage block container switching event, randomly select a location of the BCAQ, responsive to randomly selecting the location of the BCAQ, assign a second host data stream located at the location of the BCAQ that is selected to a storage block container of a memory, and control the memory to store the second host data stream in the storage block container that is assigned.

20 Claims, 4 Drawing Sheets

(56) References Cited

U.S. PATENT DOCUMENTS

| | | |
|---|---|---|
| 2021/0056023 A1 | 2/2021 | Jin et al. |
| 2021/0132827 A1 | 5/2021 | Helmick et al. |
| 2021/0208800 A1 | 7/2021 | Yang |
| 2022/0027472 A1 | 1/2022 | Golden et al. |
| 2022/0050627 A1 | 2/2022 | Pratt |
| 2022/0066868 A1 | 3/2022 | Betz et al. |
| 2023/0089022 A1 | 3/2023 | Miyamoto |

\* cited by examiner

HOST DATA STREAM ASSIGNMENT WITH SPACE-LEVELING ACROSS STORAGE BLOCK CONTAINERS

FIELD

This application relates generally to data storage devices, and more particularly, to a controller including a host data stream assignment with space-leveling across a plurality of storage block containers.

BACKGROUND

In storage architectures with host data streams assigned to storage blocks from a subset of storage block containers (e.g. Zone Namespaces enabling architectures), the issue of availability of storage blocks in sufficient number may arise within storage block containers. The issue is referred to as "space leveling," where only a subset of storage block containers having storage blocks available for use results in degradation of storage system's write performance due to suboptimal write parallelism the system has to operate in. Space leveling is considered addressed when the number of storage block containers with available storage blocks (referred to as "active storage block containers") is greater than required to achieve optimal storage system's write performance.

Certain host workloads may intentionally or not invalidate/overwrite a set of host data streams that are assigned by storage system to a subset of storage block containers. Additionally, when combined with high utilization of a storage system's capacity, only a subset of storage block containers may remain active in host data write path; which negatively impacts observed host write performance.

SUMMARY

To solve these and other problems, the embodiments described herein provide a space-leveling scheme to assigning a host data stream to a storage block container from a plurality of storage block containers. One embodiment of the present disclosure includes a data storage device. The data storage device includes a memory and a data storage controller. The data storage controller includes an electronic processor and a data storage controller memory that includes a space-leveling scheme and a block container assignment queue (BCAQ). The electronic processor, when executing the space-leveling scheme, is configured to receive a first host data stream, store the first host data stream in the BCAQ, detect a next storage block container switching event, responsive to detecting the next storage block container switching event, randomly select a location of the BCAQ, responsive to randomly selecting the location of the BCAQ, assign a second host data stream located at the location of the BCAQ that is selected to a storage block container of the memory, and control the memory to store the second host data stream in the storage block container that is assigned.

Another embodiment of the present disclosure includes a method. The method includes receiving, with a data storage controller, a first host data stream. The method includes storing, with the data storage controller performing a space-leveling scheme, the first host data stream in a block container assignment queue (BCAQ). The method includes detecting, with the data storage controller performing the space-leveling scheme, a next storage block container switching event. The method includes randomly selecting, with the data storage controller performing the space-leveling scheme, a location of the BCAQ in response to detecting the next storage block container switching event. The method includes assigning, with the data storage controller performing the space-leveling scheme, a second host data stream located at the location of the BCAQ that is selected to a storage block container of the memory in response to randomly selecting the location of the BCAQ. The method also includes controlling, with the data storage controller performing the space-leveling scheme, a memory to store the second host data stream in the storage block container that is assigned.

Yet another embodiment of the present disclosure includes an apparatus. The apparatus includes means for receiving a first host data stream. The apparatus includes means for storing the first host data stream in a block container assignment queue (BCAQ). The apparatus includes means for detecting a next storage block container switching event. The apparatus includes means for randomly selecting a location of the BCAQ in response to detecting the next storage block container switching event. The apparatus includes means for assigning a second host data stream located at the location of the BCAQ that is selected to of a storage block container of the memory in response to randomly selecting the location of the BCAQ. The apparatus also includes means for controlling a memory to store the second host data stream in the storage block container that is assigned.

Various aspects of the present disclosure provide for improvements in data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, etc.

Figure 1:
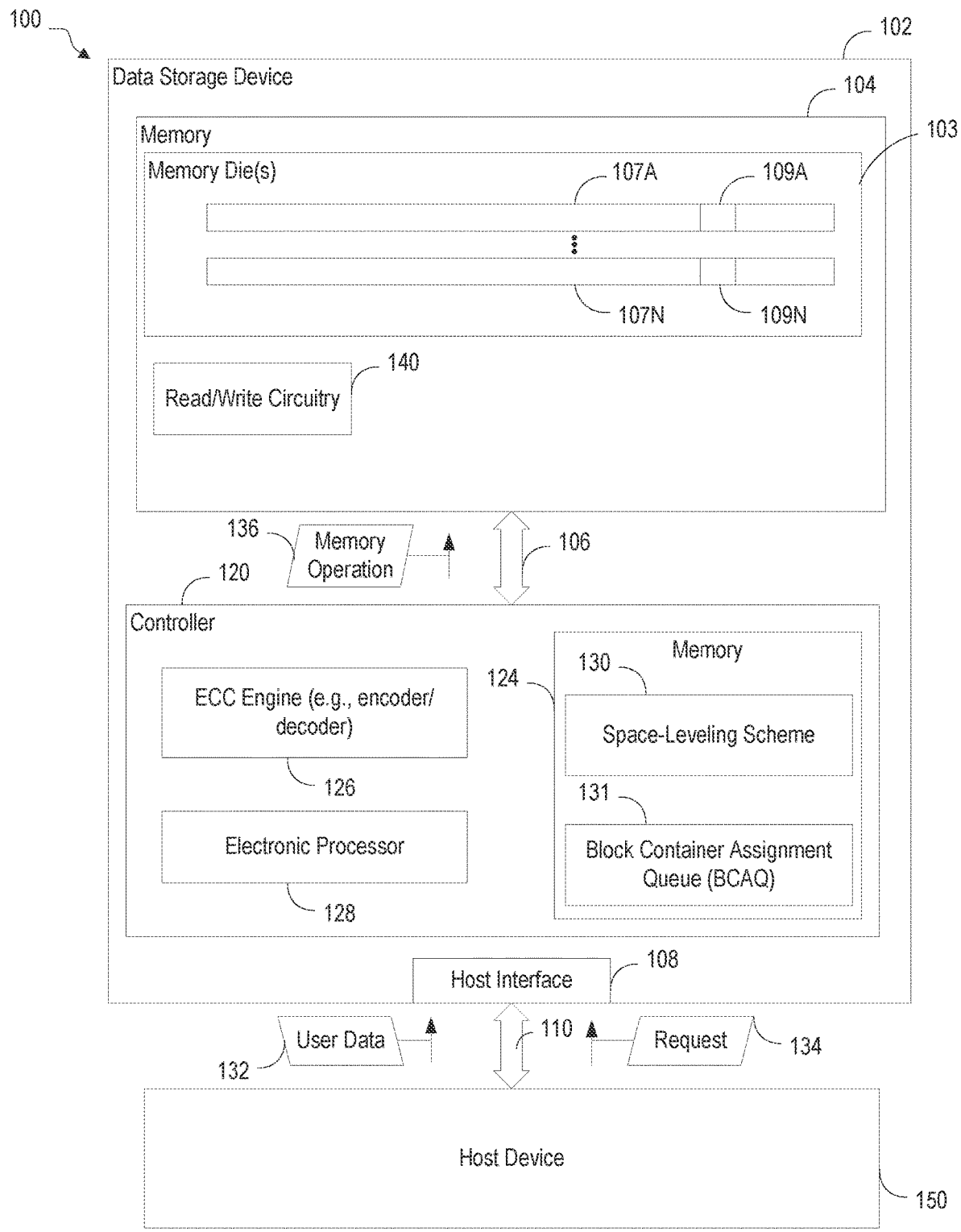
FIG. 1 is block diagram of a system including a data storage device and a host device, in accordance with some embodiments of the disclosure.

FIG. 1 is block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage controller") and a memory 104 (e.g., non-volatile memory) that is coupled to the data storage controller 120.

One example of the structural and functional features provided by the data storage controller 120 are illustrated in FIG. 1 in a simplified form. One skilled in the art would also recognize that the data storage controller 120 may include additional modules or components other than those specifically illustrated in FIG. 1. Additionally, although the data storage device 102 is illustrated in FIG. 1 as including the data storage controller 120, in other implementations, the data storage controller 120 is instead located separate from the data storage device 102. As a result, operations that would normally be performed by the data storage controller 120 described herein may be performed by another device that connects to the data storage device 102.

The data storage device 102 and the host device 150 may be operationally coupled via a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 via the communication path 110, such as a wired communication path and/or a wireless communication path. For example, the data storage device 102 may include an interface 108 (e.g., a host interface) that enables communication via the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. Additionally, the host device 150 may issue one or more vendor specific commands to the data storage device 102 to notify and/or configure the data storage device 102. For example, the host device 150 may be configured to provide data, such as user data 132, to be stored at the memory 104 or to request data to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates via a memory interface that enables reading from the memory 104 and writing to the memory 104. In some examples, the host device 150 may operate in compliance with an industry specification, a Secure Digital (SD) Host Controller specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more blocks (e.g., one or more erase blocks). Each block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies.

The data storage device 102 includes the data storage controller 120 coupled to the memory 104 (e.g., the one or more memory dies 103) via a bus 106, an interface (e.g., interface circuitry), another structure, or a combination thereof. For example, the bus 106 may include multiple distinct channels to enable the data storage controller 120 to communicate with each of the one or more memory dies 103 in parallel with, and independently of, communication with the other memory dies 103. In some implementations, the memory 104 may be a flash memory.

The data storage controller 120 is configured to receive data and instructions from the host device 150 and to send data to the host device 150. For example, the data storage controller 120 may send data to the host device 150 via the interface 108, and the data storage controller 120 may receive data from the host device 150 via the interface 108. The data storage controller 120 is configured to send data and commands (e.g., the memory operation 136) to the memory 104 and to receive data from the memory 104. For example, the data storage controller 120 is configured to send data and a write command to cause the memory 104 to store data to a specified address of the memory 104. The write command may specify a physical address of a portion of the memory 104 (e.g., a physical address of a word line of the memory 104) that is to store the data.

The data storage controller 120 is configured to send a read command to the memory 104 to access data from a specified address of the memory 104. The read command may specify the physical address of a region of the memory 104 (e.g., a physical address of a word line of the memory 104). The data storage controller 120 may also be configured to send data and commands to the memory 104 associated with background scanning operations, garbage collection operations, and/or wear-leveling operations, or other suitable memory operations.

The data storage controller 120 may include a memory 124 (for example, a random access memory ("RAM"), a read-only memory ("ROM"), a non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128. For example, the memory 124 stores a space-leveling scheme 130 and a Block Container Assignment Queue (BCAQ) 131 as described in greater detail below in FIGS. 4-6.

Additionally, although the data storage controller 120 is illustrated in FIG. 1 as including the memory 124, in other implementations, some or all of the memory 124 is instead located separate from the data storage controller 120 and executable by the electronic processor 128 or a different electronic processor that is external to the data storage controller 120 and/or the data storage device 102. For example, the memory 124 may be dynamic random-access memory (DRAM) that is separate and distinct from the data storage controller 120. As a result, operations that would normally be performed solely by the data storage controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage controller 120 and in communication with memory of the data storage device 102, and 4) a different electronic processor that is external to the data storage controller 120 and in communication with memory that is external to the data storage device 102.

The data storage controller 120 may send the memory operation 136 (e.g., a read command) to the memory 104 to cause the read/write circuitry 140 to sense data stored in a storage element. For example, the data storage controller 120 may send the read command to the memory 104 in response to receiving a request for read access from the host device 150.

Figure 2:
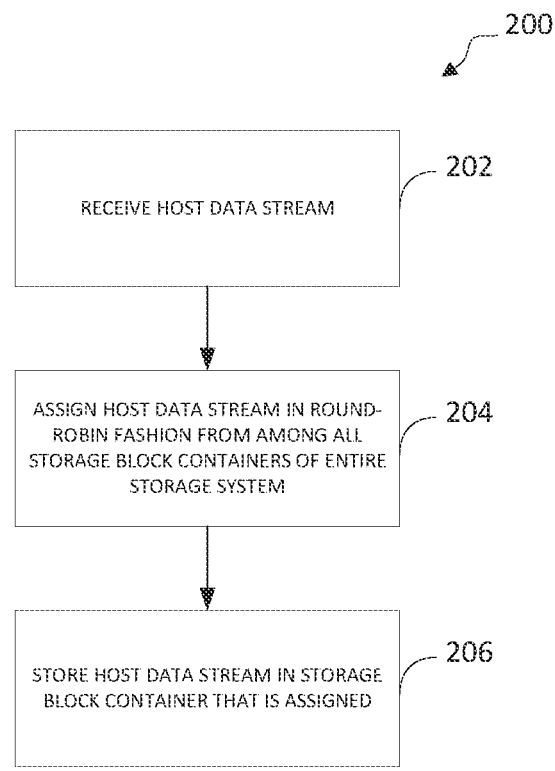
FIG. 2 is a flow diagram illustrating a comparative approach that assigns a host data stream to a storage block container from a plurality of storage block containers in round-robin fashion.

FIG. 2 is a flow diagram illustrating a comparative approach 200 that assigns a host data stream to a storage block container from a plurality of storage block containers in round-robin fashion. As illustrated in FIG. 2, in the comparative approach 200, the data storage controller 120 receives a host data stream (at block 202). In the comparative approach 200, the data storage controller 120 assigns the host data stream in a round-robin fashion from among all storage block containers of the entire storage system (at block 204). Further, in the comparative approach 200, the data storage controller 120 stores the host data stream in the storage block container that is assigned (at block 206).

In the comparative approach 200, the period of mapping a new host data stream to a storage block container is deterministic in certain workload cases, which may put the data storage device 102 in a vulnerable situation when host data streams predominantly assigned to a subset of storage block containers are invalidated/overwritten. This vulnerable situation is exacerbated when combined with high utilization of the capacity of the data storage device 102, which may result in only a subset of storage block containers remaining active in host data write path. Put simply, the round-robin assignment of the host data stream to the storage container block does not space-level the host data stream across the storage container blocks because the period of mapping a new host data stream to a storage block container is deterministic in certain workload cases.

Figure 3:
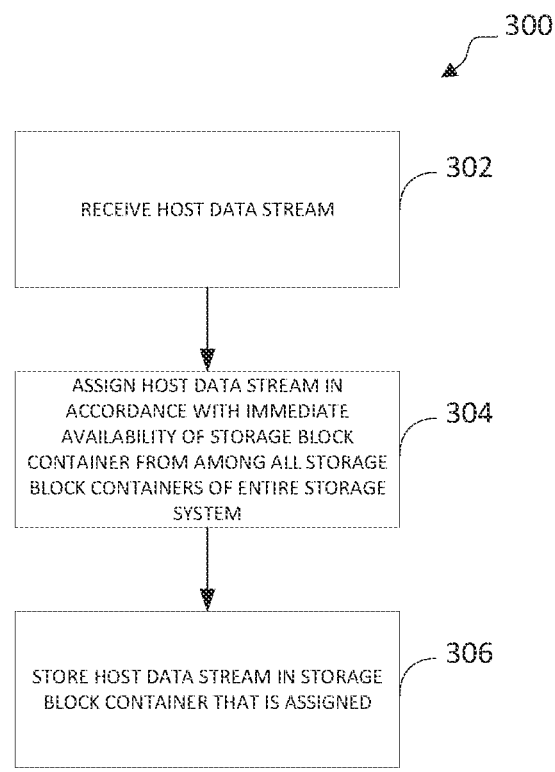
FIG. 3 is a flow diagram illustrating another comparative approach that chooses storage block containers for assignment to new host data stream in accordance with the immediate availability of a storage block container.

FIG. 3 is a flow diagram illustrating another comparative approach 300 that chooses storage block containers for assignment to new host data stream in accordance with the immediate availability of a storage block container. As illustrated in FIG. 3, in the comparative approach 300, the data storage controller 120 receives a host data stream (at block 302).

In the comparative approach 300, the data storage controller 120 assigns the host data stream in accordance with the immediate availability of a storage block container (at block 304). For example, the event of switching to Write-Idle state. Further, in the comparative approach 300, the data storage controller 120 stores the host data stream in the storage block container that is assigned (at block 306).

The comparative approach 300, like the comparative approach 200, also shows determinism. Additionally, the comparative approach 300, like the comparative approach 200, shares the same deficiency, where only a subset of storage block containers remain active in host data write path and the comparative approach 300 does not space-level the host data stream across the storage container blocks because the period of mapping a new host data stream to a storage block container is deterministic in certain workload cases.

Figure 4:
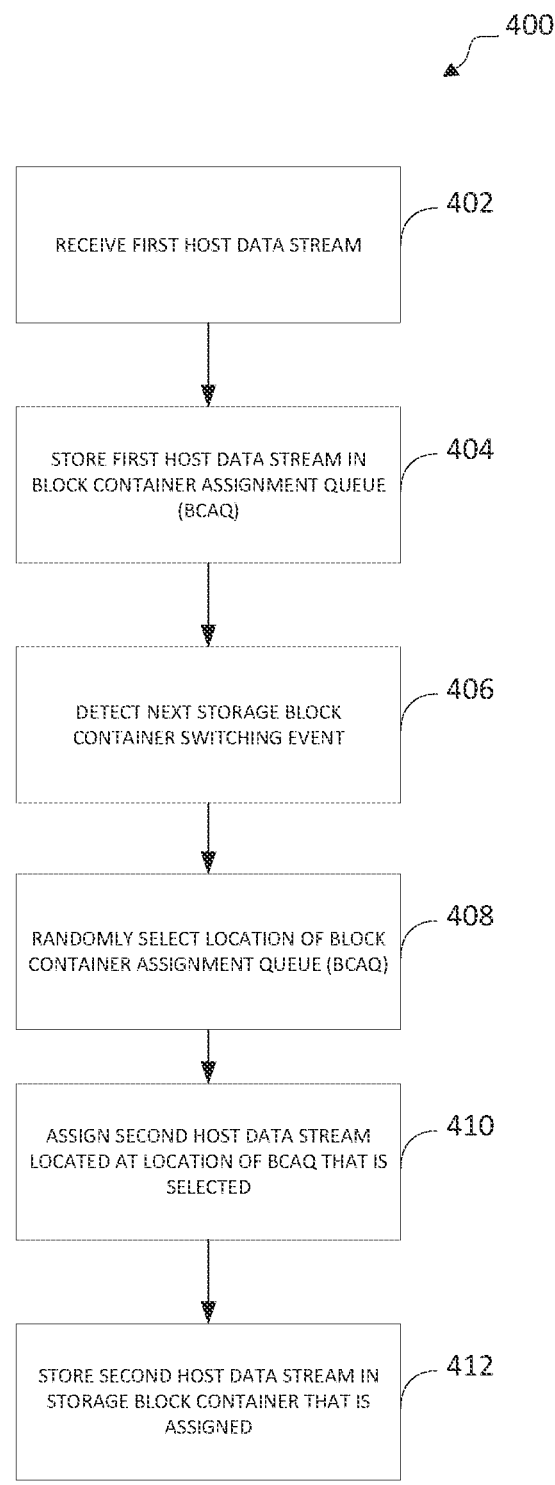
FIG. 4 is a flow diagram illustrating a space-leveling scheme that space-levels the host data stream across the storage container blocks, in accordance with some embodiments.

To solve issues identified with respect to the comparative approaches 200 and 300, FIG. 4 is a flow diagram illustrating a space-leveling scheme 400 (corresponding to the space-leveling scheme 130 of FIG. 1) that space-levels the host data stream across the storage container blocks, in accordance with some embodiments. In the space-leveling scheme 400, the data storage controller 120 receives a first host data stream (at block 402). In some examples, the space-leveling scheme 400 may include receiving a plurality of host data streams including the first host data stream.

In the space-leveling scheme 400, the data storage controller 120 stores the first host data stream in a block container assignment queue (BCAQ) (at block 404). In some examples, the space-leveling scheme 400 may include storing the plurality of host data streams in the BCAQ.

Additionally, the data storage controller 120 receiving the first host data stream and storing the first host data stream in the BCAQ is the data storage controller 120 introducing a delay between a time that the first host data stream that is received and a time that the first host data stream that is received is then assigned to a storage block from a certain storage block container. While in that delay, the first host data stream is located in queue, where host data streams pending storage block container assignment are temporarily saved, this queue corresponds to the BCAQ 131 of FIG. 1. In some examples, the delay may be the number of elements in the BCAQ 131 and the delay is not in time, but rather in space. Additionally, in some examples, the number of elements in the BCAQ 131 may be approximately two times the count of the block containers.

In the space-leveling scheme 400, the data storage controller 120 detects a next storage block container switching event (at block 406). For example, the next storage block container switching event may be a switching to a Write-Idle state. The Write-Idle state is a collective state indicating a blocks container is no longer involved in host write path. Once the Write-Idle state is detected, the system puts that the blocks container back in use by allocating a block resource from the blocks container and dispatching write requests towards that block resource.

In response to detecting the next storage block container switching event, the data storage controller 120 randomly selects a location of the BCAQ (at block 408). For example, the host data stream that is to be assigned to the BCAQ is determined by the data storage controller 120 extracting a host data stream from a location in the BCAQ 131 that is randomly picked from a range of 0 to X starting from beginning of the BCAQ 131.

In response to randomly selecting the location of the BCAQ, the data storage controller 120 assigns a second host data stream located at the location of the BCAQ that is selected to a storage block container of a memory (at block 410). For example, the data storage controller 120 assigns a second host data stream located at the location of the BCAQ 131 that is selected to a storage block container of the memory 104.

Further, in the space-leveling scheme 400, the data storage controller 120 controls the memory to store the second host data stream in the storage block container that is assigned (at block 412). For example, the data storage controller 120 controls the memory 104 to store the second host data stream in the storage block container that is assigned.

Following the space-leveling scheme 400, the period of time in the Write-Busy state for storage block containers is maximized. Further, in the space-leveling scheme 400, the host data stream to storage block container assignment pattern becomes randomized, which serves as space-leveling in the data storage device 102 because the space-leveling scheme 400 is not deterministic like comparative approaches 200 and 300. The sequence of zone identifier (IDs) belonging to a host data stream no longer maps deterministically into block containers, which makes invalidating/overwriting a subset of zone IDs in a way that block resources are released non-uniformly statistically "impossible."

Further, in some examples, the data storage controller 120, in addition to performing the space-leveling scheme 400, may also perform the comparative approach by receiving a third host data stream, assigning the third host data stream in a round-robin fashion to a first storage block container from among all storage block containers of a memory, and controlling the memory to store the third host data stream in the first storage block container that is assigned.

Furthermore, in other examples, the data storage controller 120, in addition to performing the space-leveling scheme 400, may also perform the comparative approach 300 by receiving a third host data stream, assigning the third host data stream in accordance with immediate availability of a first storage block container from among all storage block containers of a memory, and controlling the memory to store the third host data stream in the first storage block container that is assigned.

In yet other examples, the space-leveling scheme 400 may be used only for QLC/TLC blocks pool. In these examples, the comparative approach 300 may then be used with the SLC pool.

Figure 5:
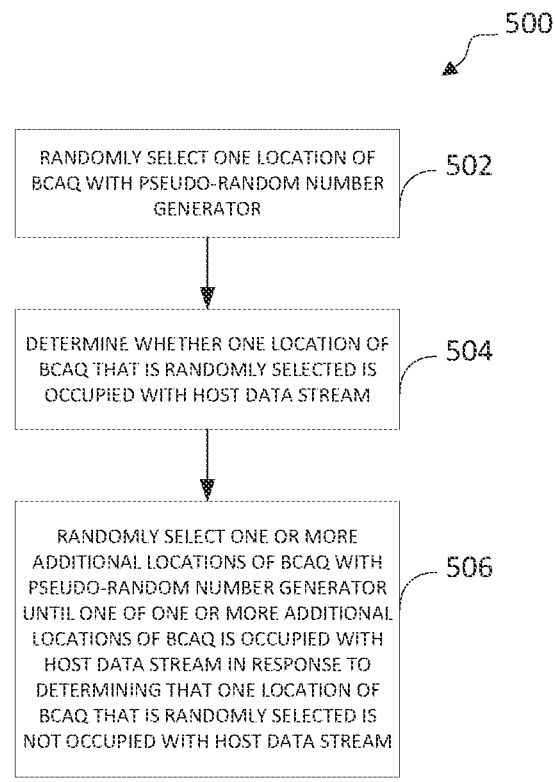
FIG. 5 is a flow diagram illustrating a method for randomly selecting the location of the BCAQ in the method of FIG. 4, in accordance with some embodiments.

FIG. 5 is a flow diagram illustrating a method 500 for randomly selecting the location of the BCAQ in the method 400 of FIG. 4, in accordance with some embodiments. The method 500 includes the data storage controller 120 randomly selecting one location of the BCAQ with a pseudo-random number generator (at block 502). The method 500 includes the data storage controller 120 determining whether the one location of the BCAQ that is randomly selected is occupied with a host data stream (at block 504).

The method 500 also includes the data storage controller 120 randomly selecting one or more additional locations of the BCAQ with the pseudo-random number generator until one of the one or more additional locations of the BCAQ is occupied with the host data stream in response to determining that the one location of the BCAQ that is randomly selected is not occupied with the host data stream (at block 506). In the method 500, the host data stream is the second host data stream of FIG. 4.

Figure 6:
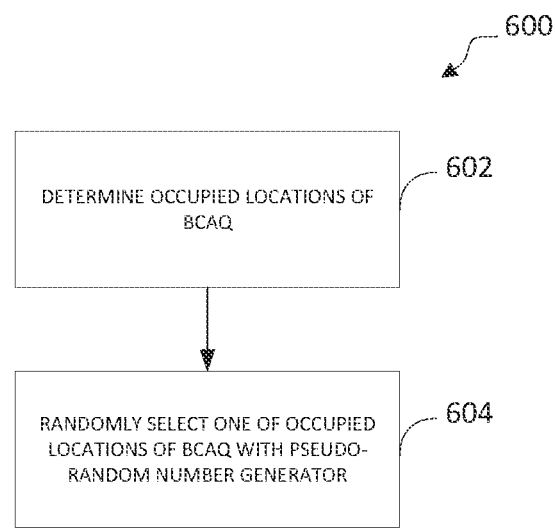
FIG. 6 is a flow diagram illustrating a method for randomly selecting the location of the BCAQ in the method of FIG. 4, in accordance with some embodiments.

FIG. 6 is a flow diagram illustrating a method 600 for randomly selecting the location of the BCAQ in the method 400 of FIG. 4, in accordance with some embodiments. The method 600 includes the data storage controller 120 determining occupied locations of the BCAQ (at block 602). The method 600 also includes the data storage controller 120 randomly selecting one of the occupied locations of the BCAQ with a pseudo-random number generator (at block 604).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device comprising:
 a memory; and
 a data storage controller including an electronic processor and a data storage controller memory that includes a space-leveling scheme and a block container assignment queue (BCAQ), the electronic processor, when executing the space-leveling scheme, is configured to:
  receive a first host data stream,
  store the first host data stream in the BCAQ,
  detect a next storage block container switching event,
  responsive to detecting the next storage block container switching event, randomly select a location of the BCAQ,
  responsive to randomly selecting the location of the BCAQ, assign a second host data stream located at the location of the BCAQ that is selected to a storage block container of the memory, and
control the memory to store the second host data stream in the storage block container that is assigned.

2. The data storage device of claim 1, wherein, to randomly select the location of the BCAQ, the electronic processor is further configured to:
randomly select one location of the BCAQ with a pseudo-random number generator,
determine whether the one location of the BCAQ that is randomly selected is occupied with a host data stream, and
responsive to determining that the one location of the BCAQ that is randomly selected is not occupied with the host data stream, randomly select one or more additional locations of the BCAQ with the pseudo-random number generator until one of the one or more additional locations of the BCAQ is occupied with the host data stream, and
wherein the host data stream is the second host data stream.

3. The data storage device of claim 1, wherein, to randomly select the location of the BCAQ, the electronic processor is further configured to:
determine occupied locations of the BCAQ, and
randomly select one of the occupied locations of the BCAQ with a pseudo-random number generator.

4. The data storage device of claim 1, wherein randomly select the location of the BCAQ and responsive to randomly selecting the location of the BCAQ, assign the second host data stream located at the location of the BCAQ that is selected to the storage block container is an introduction of a delay between a first time that the second host data stream is received and a second time that the second host data stream that is then assigned to the storage block container.

5. The data storage device of claim 1, wherein when executing the space-leveling scheme, the electronic processor is configured to:
receive a plurality of host data streams including the first host data stream, and
store the plurality of host data streams in the BCAQ.

6. The data storage device of claim 1, wherein the electronic processor is further configured to:
assign the first host data stream in a round-robin fashion to a first storage block container from among all storage block containers of the memory, and
control the memory to store the first host data stream in the first storage block container that is assigned.

7. The data storage device of claim 1, wherein the electronic processor is further configured to:
assign the first host data stream in accordance with immediate availability of a first storage block container from among all storage block containers of the memory, and
control the memory to store the first host data stream in the first storage block container that is assigned.

8. A method comprising:
receiving, with a data storage controller, a first host data stream;
storing, with the data storage controller performing a space-leveling scheme, the first host data stream in a block container assignment queue (BCAQ);
detecting, with the data storage controller performing the space-leveling scheme, a next storage block container switching event;
randomly selecting, with the data storage controller performing the space-leveling scheme, a location of the BCAQ in response to detecting the next storage block container switching event;
assigning, with the data storage controller performing the space-leveling scheme, a second host data stream located at the location of the BCAQ that is selected to a storage block container of a memory in response to randomly selecting the location of the BCAQ; and
controlling, with the data storage controller performing the space-leveling scheme, the memory to store the second host data stream in the storage block container that is assigned.

9. The method of claim 8, wherein randomly selecting the location of the BCAQ further includes
randomly selecting one location of the BCAQ with a pseudo-random number generator,
determining whether the one location of the BCAQ that is randomly selected is occupied with a host data stream, and
randomly selecting one or more additional locations of the BCAQ with the pseudo-random number generator until one of the one or more additional locations of the BCAQ is occupied with the host data stream in response to determining that the one location of the BCAQ that is randomly selected is not occupied with the host data stream, and
wherein the host data stream is the second host data stream.

10. The method of claim 8, wherein randomly selecting the location of the BCAQ further includes
determining occupied locations of the BCAQ, and
randomly selecting one of the occupied locations of the BCAQ with a pseudo-random number generator.

11. The method of claim 8, wherein randomly selecting the location of the BCAQ and assigning the second host data stream located at the location of the BCAQ that is selected to the storage block container is an introduction of a delay between a first time that the second host data stream is received and a second time that the second host data stream that is then assigned to the storage block container.

12. The method of claim 8, further comprising:
receiving a plurality of host data streams including the first host data stream; and
storing the plurality of host data streams in the BCAQ.

13. The method of claim 8, further comprising:
receiving a third host data stream;
assigning the third host data stream in a round-robin fashion to a first storage block container from among all storage block containers of the memory; and
controlling the memory to store the third host data stream in the first storage block container that is assigned.

14. The method of claim 8, further comprising:
receiving a third host data stream;
assigning the third host data stream in accordance with immediate availability of a first storage block container from among all storage block containers of the memory; and
controlling the memory to store the third host data stream in the first storage block container that is assigned.

15. A apparatus comprising:
means for receiving a first host data stream;
means for storing the first host data stream in a block container assignment queue (BCAQ);
means for detecting a next storage block container switching event, means for randomly selecting a location of the BCAQ in response to detecting the next storage block container switching event;

means for assigning a second host data stream located at the location of the BCAQ that is selected to a storage block container of a memory in response to randomly selecting the location of the BCAQ; and means for controlling the memory to store the second host data stream in the storage block container that is assigned.

16. The apparatus of claim 15, wherein means for randomly selecting the location of the BCAQ further includes means for randomly selecting one location of the BCAQ with a pseudo-random number generator, means for determining whether the one location of the BCAQ that is randomly selected is occupied with a host data stream, and means for randomly selecting one or more additional locations of the BCAQ with the pseudo-random number generator until one of the one or more additional locations of the BCAQ is occupied with the host data stream in response to determining that the one location of the BCAQ that is randomly selected is not occupied with the host data stream, wherein the host data stream is the second host data stream.

17. The apparatus of claim 15, wherein means for randomly selecting the location of the BCAQ further includes means for determining occupied locations of the BCAQ, and means for randomly selecting one of the occupied locations of the BCAQ with a pseudo-random number generator.

18. The apparatus of claim 15, wherein means for randomly selecting the location of the BCAQ and means for assigning the second host data stream located at the location of the BCAQ that is selected to the storage block container is an introduction of a delay between a first time that the second host data stream is received and a second time that the second host data stream that is then assigned to the storage block container.

19. The apparatus of claim 15, further comprising:

means for receiving a plurality of host data streams including the first host data stream; and means for storing the plurality of host data streams in the BCAQ.

20. The apparatus of claim 15, further comprising:

means for receiving a third host data stream;

means for assigning the third host data stream in a round-robin fashion to a first storage block container from among all storage block containers of the memory; and means for controlling the memory to store the third host data stream in the first storage block container that is assigned.

* * * * *